July 22, 1930.  D. MILLER  1,771,267
OIL COLLECTING APPARATUS FOR DOUGH DIVIDING MACHINES
Filed April 21, 1928
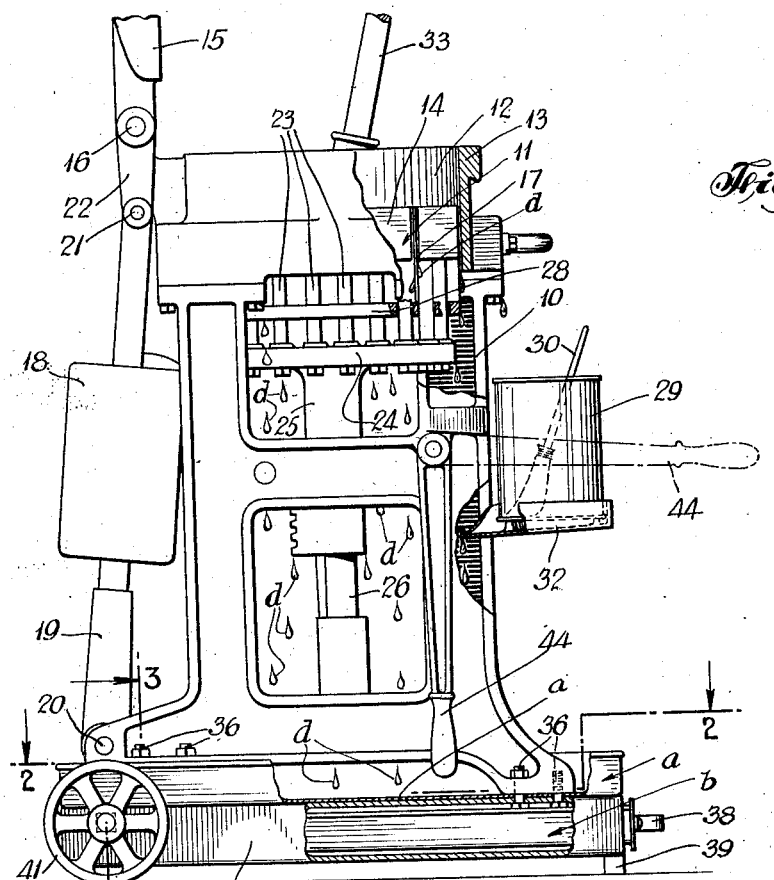
Fig.1.
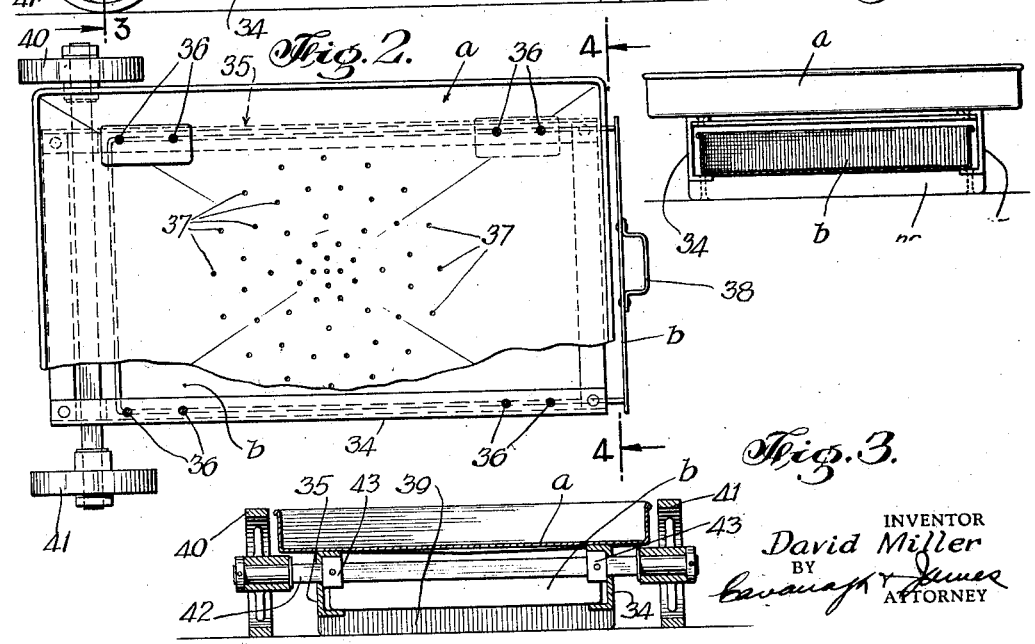
Fig.2.
Fig.4.
Fig.3.
INVENTOR
David Miller
BY
Cavanagh & James
ATTORNEY Patented July 22, 1930

1,771,267

UNITED STATES PATENT OFFICE

DAVID MILLER, OF BROOKLYN, NEW YORK

OIL-COLLECTING APPARATUS FOR DOUGH-DIVIDING MACHINES

Application filed April 21, 1928. Serial No. 271,704.

This invention relates to dough dividing machines and has special reference to the provision of an apparatus for collecting and recovering oil expressed from said dough dividing machines in the operation thereof.

In the operation of standard dough dividing machines, dough dividing apparatus is actuated to flatten out or compact a mass of dough into a cake or disk which substantially fills a dough dividing compartment and to then cut such cake or disk into a multiplicity of equal parts or sections. To prevent the dough from adhering or "sticking" to the walls of the dough dividing compartment, the said walls are first coated with a layer or coating of baking oil usually applied with a brush in fair or copious amounts.

In the dough compacting and cutting operations, a substantial part of the oil used in the coating step is expressed or extruded from the machine mixed with small particles of dough. This mixture drips from the dough dividing apparatus onto and over the framework of the machine, part of the drippings lodging on the framework and parts of the apparatus and other parts of the drippings collecting on the floor or other support on which the machine is mounted, with the result that the machine framework as well as the working floor area therefor becomes unsightly and unclean after short periods of use of the machine, necessitating repeated and time consuming cleansing operations. Furthermore, I have found that substantially one-half of the oil employed is thus extruded or expressed from the machine and is thereby wasted.

A prime desideratum of my present invention centers about the provision of a dough dividing machine in which the oil and dough drippings expressed from the machine in the operation thereof are collected and disposed of in a manner to produce a clean and sanitary use of the machine over extended periods of time, thus obviating the aforementioned disadvantages incident to the prior use of these machines.

A further prime object of my present invention is directed to the provision of apparatus for dough dividing machines functioning to collect the dripping mixture of dough and oil extruded therefrom and to separate and recover the oil from the mixture for further use.

Other prime objects of the invention include the provision of a mechanism for separating and recovering the oil expressed from the dough dividing machine, which mechanism is made in the form of an attachment which may be readily applied to standard dough dividing machines.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which:

Fig. 1 is a side elevational view of a dough dividing machine with the apparatus of my invention applied thereto, parts of the machine and apparatus being shown in section;

Fig. 2 is a view of the apparatus of my invention, taken in cross-section in the planes of the broken line 2—2, Fig. 1 and with parts broken away;

Fig. 3 is a view taken in cross-section in the plane of the open line 3—3, Fig. 1; and Fig. 4 is a view taken in cross-section in the plane of the line 4—4, Fig. 2.

Referring now more in detail to the drawings, having reference first to Fig. 1 thereof, the dough dividing machine to which the apparatus of my invention may be applied comprises a framework 10 and a dough dividing apparatus generally designated as 11 operatively supported thereon. The dough dividing apparatus 11 is of a wellknown and standard make and comprises a dough receiving compartment 12 defined by an enclosure framework wall 13, a vertically movable bottom wall 14, and a closure or door (partly shown) 15, the said closure being hingedly mounted at 16. In the compartment 12 a mass of dough to be sub-divided is placed; and in the operation of the machine the said dough mass is first compacted into a flat cake and then cut into a multiplicity of equal parts. This is accomplished by the upward movement first imparted to the sectionalized movable bottom 14 and then by the operation of a plurality of knives, one of which, 17, is shown in the drawings, the said knives being independently movable in the bottom wall 14.

The operating parts of the dough dividing machine being well known and forming no part of my invention, the same are herein illustrated merely in a fragmentary way but sufficient to explain the principles and operation of my present invention. The weighted door 15 is counter-balanced by a weight 18, the lower end of which is slidably mounted in a sleeve 19 pivoted at 20 to the framework 10 of the machine and the upper end of which is hinged as at 21 to an arm 22 formed integral with the closure or door 15. The sections of the movable bottom wall 14 are mounted on a plurality of studs or rods 23, 23 fixed to a plate 24 which plate is formed integral with a sleeve 25 keyed for limited slidable movement to a vertical operating shaft 26. The knives 17 are all affixed to a plate 28 which is movable independently of the plate 24 and which is guided by the studs or rods 23.

In operation, the parts are first caused to assume the position shown in Fig. 1 of the drawings with the door or closure 15 open. Before placing a mass of dough in the dough dividing compartment 12, the walls 13 and 14 thereof are coated or painted with a layer or coating of oil taken from an oil supply receptacle 29 by means of a brush 30, the oil supply receptacle being stationed on a drip pan 32 fixed to the framework 10 of the machine, as clearly shown in Fig. 1 of the drawings. The dough mass is then placed in the compartment 12 and the door 15 closed and latched. An operating lever 33 is then depressed for causing the bottom wall 14 and knives 17 to be moved into an elevated position for flattening the dough mass against the covering or door 15; this to effect an even spread or distribution of the mass in the dough compartment 12, after which the knives 17, by continued movement of the operating lever 33, are given an independent upward movement effective for cutting the flattened dough mass into a multiplicity of parts.

In these dough compacting and cutting operations, oil mixed with particles of dough is forced through the passages and crevices existing between the knives 17 and the sectionalized bottom wall 14, as well as between the bottom wall 14 and the surrounding wall 13, and this mixture falls from the machine in drippings illustrated as $d$, $d$ in Fig. 1 of the drawings.

In accordance with my present invention, I provide means for collecting the dough and oil mixture which is extruded or expressed from the dough dividing machine in a manner to produce a clean and sanitary use of the machine over extended periods of time and for separating the oil from the particles of dough for the purpose of recovering said oil for further use. I have found that substantially half of the oil used may be thus recovered or salvaged for re-use. These objects of the invention I accomplish by providing a means generally designated as $a$ arranged below and covering the area of the dough dividing apparatus and functioning for receiving the drippings of oil and dough expressed from said apparatus combined with a means generally designated as $b$ communicating with said separating means $a$ for receiving and collecting the oil separated thereby.

In the preferred embodiment of the invention, the apparatus for collecting and recovering the oil is made in the form of an attachment which may be readily applied to the base of the machine framework 10 and the same comprises a pair of supporting channel irons 34 and 35, one arranged on each side of the machine, which channel irons are bolted to the legs of the framework 10 by means of the bolts or other securing means 36, 36. The means $a$ which receives the oil and dough drippings, comprises an open pan extending over an area covering substantially the complete machine so that oil drippings from all sources, including the pan 32 may be collected and recovered. The pan $a$, which is desirably bolted between the framework 10 and the channel irons 34 and 35, is preferably dished and provided centrally with a plurality of orifices 37, 37 which function to strain the oil and thus separate the same from the particles of dough which are retained in the pan and which may be removed therefrom from time to time. The means $b$ comprises a collecting receptacle arranged below the pan $a$ and receiving the oil strained therethrough and desirably this receptacle comprises a drawer slidably receivable by the channel irons 34 and 35, the said drawer being provided with a handle 38.

For both stationarily and transportably supporting the machine, I provide a front supporting leg 39 secured at its opposite ends to the channel irons 34 and 35 and rear supporting wheels 40 and 41 journalled on an axle 42 which is mounted in the channel irons 34 and 35 and held against transverse movement therein by means of spaced collars 43, 43. This wheel and axle structure is supplied with the standard machine and is usually mounted at the rear of the framework 10 thereof, the axle being coincident with the pivot 20 of the sleeve 19. In applying the attachment apparatus of my present invention, the wheel and axle structure is removed from its customary position and is remounted in the channel irons 34 and 35, as described and as best shown in Figs. 1 to 3 of the drawings. It will be understood that in moving the apparatus from place to place, a pair of handles 44 (one of which is shown in Fig. 1 of the drawings) is moved from the full to the dotted line position shown in Fig. 1 of the drawings, said handles forming levers for raising the front end of the machine from the foot support 39.

The use and operation of the oil collecting apparatus of my present invention and the many advantages thereof will in the main be fully apparent from the above detailed description thereof. It will be apparent that the combined oil separating and collecting means forms compositely an attachment which may be readily secured to the bottom of the framework 10 of the dough dividing machine without altering the construction of the machine, other than removing the wheeled support 40 to 42 therefor, which wheeled support is then replaced by being mounted on the attached apparatus. It will be further evident that the collecting means $a$ is positioned to receive the drippings of mixed oil and dough from all parts of the apparatus and to strain the oil from the mixture, which oil drains into the collecting receptacle $b$. The particles of dough which remain on the strainer pan $a$ may be scraped therefrom from time to time with ease and convenience. The separated oil collecting in the receptacle $b$ may be removed at will from time to time for re-use. With the use of apparatus of the invention therefor, I am enabled not only to effect a substantial economy by recovering the oil otherwise wasted but to eliminate the unsanitary disadvantages incident to the use of these dough dividing machines.

While I have shown and described my invention in the preferred form, it will be apparent that many changes and modifications may be made in the structure disclosed without departing from the spirit of the invention, defined in the following claims.

I claim:

1. In a dough dividing machine, in combination with the dough dividing apparatus thereof, of mechanism for separating and recovering oil expressed from said dough dividing apparatus in the operation thereof, said mechanism comprising means arranged below and covering the area of said dough dividing apparatus receiving drippings of oil and dough expressed from said apparatus and functioning to separate the expressed oil from the drippings of dough, and means communicating with said separating means for receiving said separated oil.

2. A dough dividing machine comprising in combination, a framework, a dough dividing apparatus supported on said framework, and mechanism for straining and recovering oil expressed from said dough dividing apparatus in the operation thereof, said mechanism comprising a strainer arranged underneath said framework and covering substantially the full area of said dough dividing machine, said strainer functioning to separate the expressed oil from drippings of dough received thereby, and a receptacle below said strainer for receiving and collecting said separated oil.

3. In a dough dividing machine, in combination with the dough dividing apparatus, of mechanism for straining and recovering oil expressed from said dough dividing apparatus in the operation thereof, said mechanism comprising a pan strainer arranged below and covering the area of said dough dividing apparatus, said pan strainer functioning to separate the expressed oil from drippings of dough received thereby, and a slidably removable drawer below said strainer for receiving and facilitating the removal of the separated oil.

4. A dough dividing machine comprising in combination, a framework, dough dividing apparatus supported on said framework, and mechanism for straining and recovering oil expressed from said dough dividing apparatus in the operation thereof, said mechanism comprising a pair of channel irons supporting said framework, one channel iron being arranged on each side of the framework, a strainer pan covering the area of said dough dividing apparatus secured between said framework and channel irons, said strainer pan functioning to separate the expressed oil from drippings of dough received thereby, and a receptacle below said strainer pan slidable in said channel irons and functioning for receiving and collecting said separated oil.

5. In a dough dividing machine, dough dividing apparatus, an oil supply receptacle arranged adjacent thereto, a drip pan beneath said receptacle and mechanism for straining and recovering oil dripping from said dough dividing machine in the operation thereof and dripping from said drip pan, said mechanism comprising a strainer arranged below and covering the area of said dough dividing apparatus and oil supply receptacle, said strainer functioning to separate the expressed oil from drippings of dough received thereby, and a receptacle below said strainer for receiving and collecting said separated oil.

Signed at New York city in the county of New York and State of New York this 19th day of April, A. D. 1928.

DAVID MILLER.